United States Patent [19]

East

[11] Patent Number: 5,005,373
[45] Date of Patent: Apr. 9, 1991

[54] ROOF UNIT FOR EVAPORATIVE COOLER

[76] Inventor: Mark East, 6615 Berquist Ave., West Hills, Calif. 91304

[21] Appl. No.: 437,116
[22] Filed: Nov. 16, 1989
[51] Int. Cl.$^5$ .............................................. F25D 23/12
[52] U.S. Cl. .................................... 62/259.1; 62/304
[58] Field of Search ................. 62/304, 309, 311, 310, 62/259.1, DIG. 16; 52/311, 57, 173 R, 199, 455, 460

[56] References Cited

U.S. PATENT DOCUMENTS 486,655  11/1892  Williamson ........................... 62/304

Primary Examiner—Henry A. Bennet
Attorney, Agent, or Firm—Elliott N. Kramsky

[57] ABSTRACT

An insulative roof unit for an evaporative cooler of the type that is fixed to the roof of a home or office building. A tower-like enclosure element that includes a spire, a plurality of support columns and a base surrounds the block-like cooler. Flanges protrude from the columns, the base and the top of an enclosure structure, forming channels for capturing removable side panels that prevent undesired heat transfer that would otherwise occur during cold weather.

8 Claims, 2 Drawing Sheets

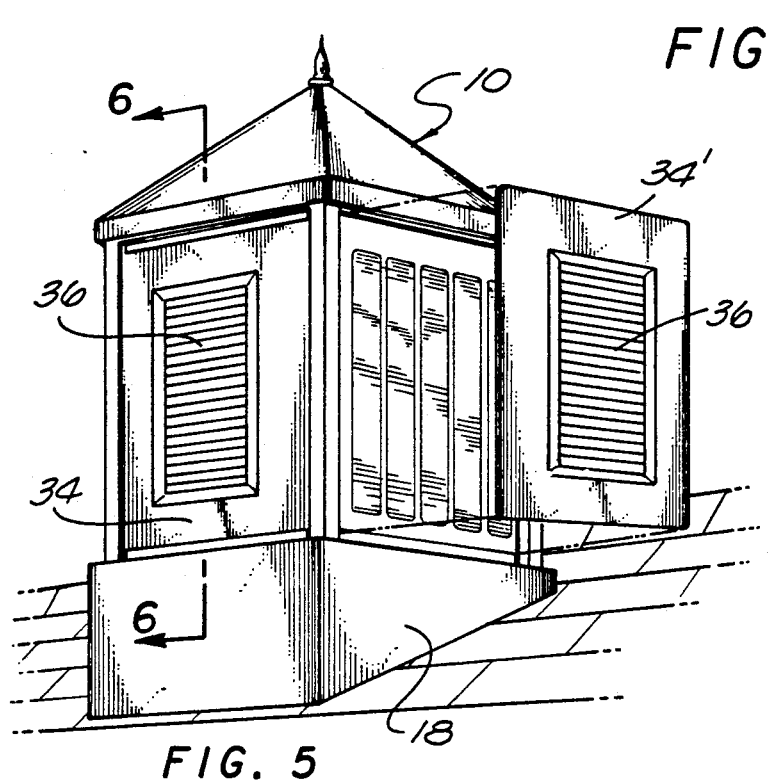
FIG. 5
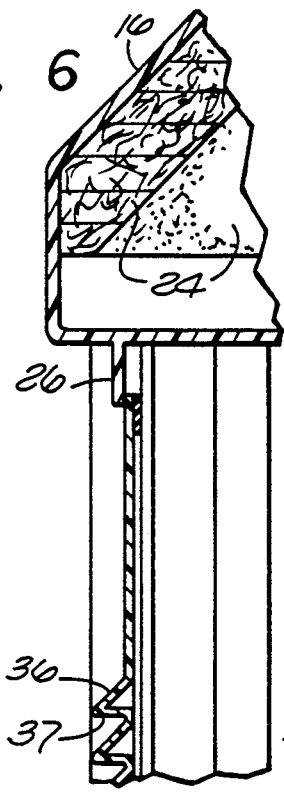
FIG. 6
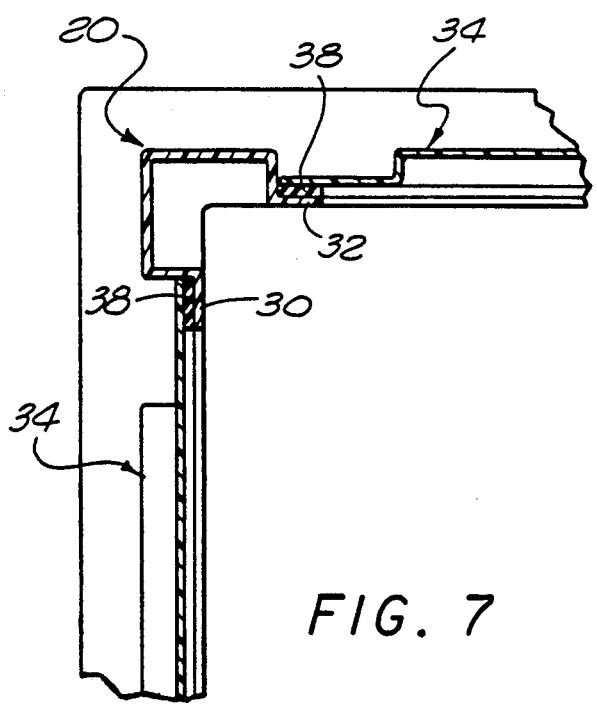
FIG. 7
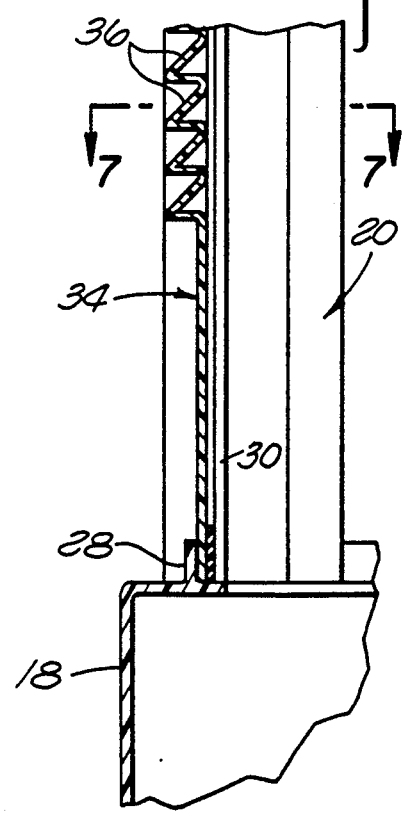

ROOF UNIT FOR EVAPORATIVE COOLER

BACKGROUND

1. Field of the Invention

The present invention relates to apparatus for protecting and enhancing the appearance of exposed, roof-situated cooling equipment. More particularly, this invention pertains to a roof unit for a conventional evaporative cooler.

2. Background of the Prior Art

Evaporative or "swamp" coolers are employed quite commonly for both home and office temperature control. Such units are designed for mounting on the roof of the home or office structure and include inter alia a blower and a pump for generating water flow. As air enters the unit, the water evaporates, cooling the air. The cooled air is then blown inside the structure.

While such coolers function effectively in hot (and, particularly, in dry) environments, their usage poses numerous problems. Since they are designed for roof mounting, these (metallic) structures are subject to intense heating as the sun beats down. Temperatures may be reached at which the cooling efficiency is drastically reduced, leading to increased costs of operation and maintenance expense. Conversely, during the winter months such units, which necessarily provide air flow paths into the housing or office structure, must be covered to prevent the escape of heat from the interior. Again, the mere presence of the evaporative cooler on the roof can lead to further diseconomies.

In addition to problems posed by the exposure of the roof-mounted units, such units (which come in three standardized cube-like sizes for residential use) are generally unattractive, presenting a bulky and weathered appearance, and can depreciate the value of both a house and the surrounding neighborhood. Often, where possible, such units are mounted on the rear half of a pitched roof to secrete such "eyesores" from view. However, the pitch of the roof is often insufficient to conceal the unit. Furthermore, even rear-mounted coolers are visible from the backyards of both the owner and his neighbors.

Some attempts have been made to deal with the problems associated with the necessary roof mounting of evaporative coolers. Canvas tarps are commonly used during the winter months when the cooler is not required, reducing heat transfer and attendant costs. Such tarps or other coverings provide limited protection against heat loss. However, the compositions of the generally-unsightly flexible covers are generally somewhat permeable and of insufficient insulative character to prevent the loss of a material amount of heat. Therefore, one must expect to realize increased heating bills during the winter months from a roof-mounted evaporative cooler.

Fences have been employed to enhance the aesthetic values of roof-mounted coolers. Unfortunately, such picket-like structures often appear out of place on a roof, doing little to enhance the appearance of the structure.

SUMMARY OF THE INVENTION

The present invention addresses the foregoing and additional shortcomings of the prior art by providing an insulative roof unit. Such a unit includes an evaporative cooler of the type that includes an underlying frame for engaging the roof. A tower-like enclosure element is provided. Such an element is arranged to surround the cooler and includes a base, a plurality of upright columns and a spire that is supported by the columns. The base surrounds the underlying frame and the columns surround the body of the cooler. The enclosure element is formed of material of lesser thermal conductivity than that of the cooler.

The foregoing and additional features of the invention will become further apparent from the detailed description that follows. This description is accompanied by a set of drawing figures. Numerals of the figures, corresponding to those of the written description, point to the features of the invention. Like numerals refer to like features throughout both the written description and the drawing figures.

BRIEF DESCRIPTION OF THE DRAWINGS

FIG. 5 is a perspective view of the roof unit of the invention configured for winter operation with one side panel mounted and another in exploded perspective view;

FIG. 6 is a side sectional view of the invention taken at section line 6—6 of FIG. 5 for illustrating the manner of engagement of a removable side panel to the enclosure element of the invention;

FIG. 7 is a top sectional view of a support column taken at line 7—7 of FIG. 6 for illustrating the manner in which the vertical flanges of the columns capture the removable side panels.

DETAILED DESCRIPTION

Figure 1:
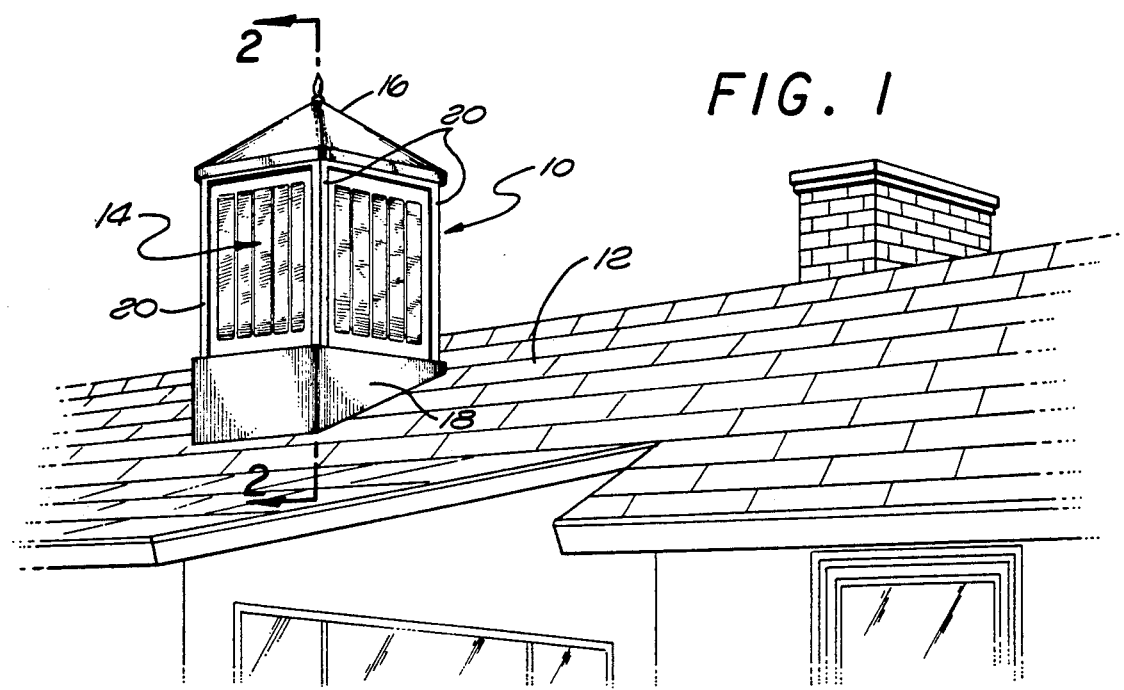
FIG. 1 is a perspective view of a roof unit in accordance with the invention with side panels removed.

Turning now to the drawings, FIG. 1 is a perspective view of a roof unit 10 in accordance with the invention (side panels removed). The unit 10 is positioned atop the roof 12 of a residence or office structure. As shown, the unit 10, which does not include four removable side panels (discussed below) is configured for warm weather operation (i.e. "cooling"). That is, removal of the panels permits the required air flow through the side air vents of a conventional evaporative cooler 14.

The unit 10 presents an attractive, overall steeple-like, structure that includes a cooler enclosure element having a decorative pitched or pointed spire 16, a base 18 and corner support columns 20. The overall aesthetic effect of the functional device is quite pleasing, transforming the unattractive box-like shape of the often weather-beaten cooler.

The enclosure element comprising the spire 16, the base 18 and corner support columns 20 is preferably formed as a unitary molded piece formed of one-quarter (¼) inch injection-molded fiberglass or the like. Alternatively, it could be formed of sheet metal provided with an insulative fiberglass lining. In either event, the roof unit 10 insulates the substantially metallic evaporative cooler 14 from the sun's rays. Such exposure may generate furnace-like temperatures that can drastically effect both the useful life and the efficiency of the device.

Figure 2:
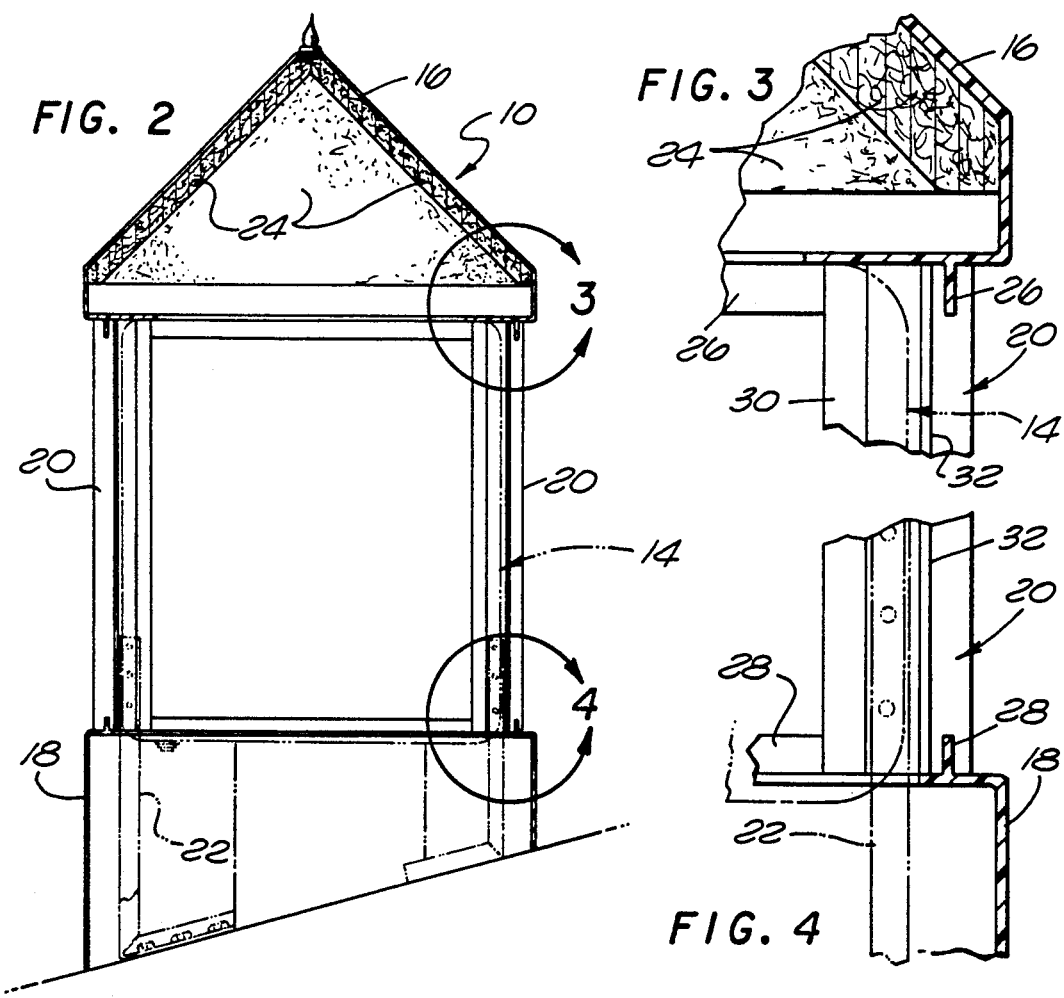
FIG. 2 is a cross-sectional view of the invention taken at line 2—2 of FIG. 1 with the evaporative cooler and mounting structure therefor in phantom outline to facilitate illustration of the steeplelike enclosure.

FIG. 2 is a cross-sectional view of the invention taken at line 2—2 of FIG. 1. For purposes of illustration, the evaporative cooler 14 and the mounting frame 22 bolted thereto are shown in phantom view. As can be seen, the frame 22 comprises an arrangement of brackets that compensates for roof pitch, maintaining the evaporative cooler 14 in the substantially horizontal attitude required for proper operation. The base 18 of the enclosure element surrounds the frame 22 to remove the unsightly undergirding from view. (The base 18 of the enclosure element is preferably manufactured without any particular inclination or pitch. This permits a single configuration that can be installed by cutting the bottom of the base to match the pitch of the roof 12).

An insulative layer 24 is fixed to the interior of the molded spire. The layer 24, preferably comprising one and one-half (1½) inch thick, two-pound density duct liner serves both to protect the cooler 14 from the sun during the summer months.

Figure 3:
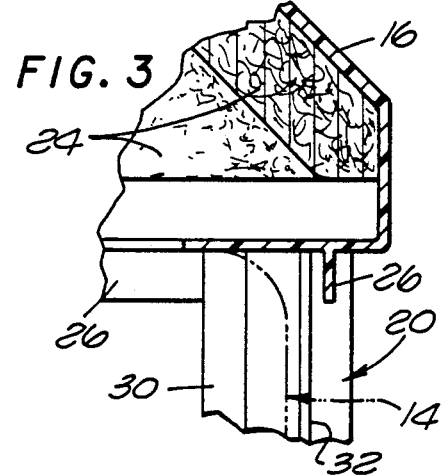
FIGS. 3 and 4 are enlarged views of the encircled portions numbered "3" and "4" respectively of FIG. 2.
Figure 4:
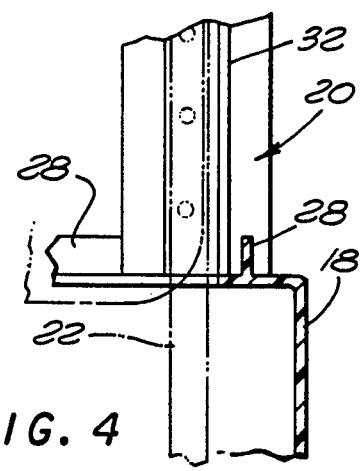

FIGS. 3 and 4 are enlarged views of portions of the invention encircled and identified in FIG. 2 as "3" and "4" respectively. Turning first to FIG. 3, a flange 26 projects downwardly from the bottom of the spire 16 of the enclosure element. The flange 26 is arranged adjacent the periphery of the bottom of the spire 16, forming a discontinuous ridge having "breaks" at the four corner columns 20. Such structure will become further evident in the discussion that follows. Similarly, a flange 28, arranged adjacent the periphery of the base 18, projects upwardly, again forming a (matching) discontinuous ridge. Vertical flanges 30 and 32, formed with the columns 20, are arranged in spaced relationship to the flanges 26 and 28, thereby forming recesses or channels for accepting side panels. The interrelationships between such flanges, channels and the mounting of the removable side panels will be further disclosed with particular reference to FIGS. 6 and 7.

FIG. 5 is a perspective view of the roof unit of the invention configured for winter or cold weather operation. As shown, a removable side panel 34 is shown "in place" while another side panel 34' (four side panels altogether) is shown in exploded view with respect to the remainder of the unit 10.

Each of the side panels includes a decorative framed interior comprising a plurality arrangement of horizontal louvers 36. However, as can be seen in FIG. 6, a side sectional view of the invention taken at line 6—6 of FIG. 5, a horizontal lip 37 "fills" the gap that would otherwise exist between adjacent louvers 36. As a result, the removable side panels are integral structures that posses no apertures. Therefore, the panels, when inserted, effectively prevent air flow and the attendant transfer of heat, between the interior of the residence or office and the atmosphere. The panels thus provide an attractive and easily-removable means for "boarding up" the flow paths associated with evaporative coolers during the cold winter months, minimizing fuel bills.

As can be seen in FIG. 6, the (representative) panel 34 is captured adjacent its top and bottom edges in channels formed between the downward facing flange 26, the upward facing flange 28 and the vertical flange 30 of the column 20. (As shown in FIG. 7, a cross-sectional view taken at line 7—7 of FIG. 6, the vertical flanges 30 and 32 protrude from the edges of the (representative) column 20.) A seal 38 of weatherstrip material is fixed to the inner edge of the panel 34, thereby further assuring that heat transfer from the interior of the structure to the atmosphere will be minimized. The panels are preferably formed of one quarter inch thick fiberglass.

In order to effect maximum benefits, it is essential that the transition between the winter (cold) weather and summer (hot) weather configurations can be effected without unnecessary difficulty. Otherwise, the user might neglect to perform the necessary modifications regularly and thereby fail to realize maximum energy savings. As discussed, this transition involves the insertion or removal of the side panels of the enclosure element. Referring back to FIG. 6, this goal is attained by dimensioning the means for "capturing" a side panel so that the length of the downward-facing flange 26 exceeds that of the upward-facing flange 28. This permits the user to insert the top edge of a side panel between the flange 26 and a vertical column flange until the bottom of that panel is above the lower flange 28. The panel may then be "dropped" into place as shown, captured at both its top and bottom edges.

Thus, the present invention provides a novel roof unit that enhances the utility of an evaporative cooler of the type that is commonly found on the roof of a residence or office building. By employing such a roof unit, one may realize the advantages of such a cooler without suffering the otherwise attendant aesthetic and economic drawbacks.

While this invention has been described with relation to its presently preferred embodiment, it is not limited thereto. Rather, this invention is limited only insofar as defined by the following set of claims and includes within its scope all equivalents thereof.

What is claimed is:

1. An insulative roof unit comprising, in combination:
   (a) an evaporative cooler, said cooler including an underlying frame for engaging said roof;
   (b) a tower-like enclosure element, said element being arranged to surround said cooler and including means capable of removably receiving vertical panels;
   (c) said enclosure element including a base, a plurality of upright columns and a spire, said spire being supported by said columns and said means capable of removably receiving vertical panels including (i) an upwardly-directed flange adjacent the periphery of said base, (ii) a downwardly-directed flange adjacent the periphery of said spire, and (iii) said columns including vertical edge flanges whereby said flanges form channels for removably capturing the top and bottom edges of vertical side panels;
   (d) said base surrounding said underlying frame and said column surrounding said body of said cooler; and
   (e) said enclosure element is formed of material of lesser thermal conductivity than said cooler.

2. A roof unit as defined in claim 1 wherein the height of said downwardly-directed flange exceeds that of said upwardly-directed flange.

3. A roof unit as defined in claim 2 wherein said spire is pointed.

4. A roof unit as defined in claim 3 wherein said spire includes an interior layer of insulation.

5. A roof unit as defined in claim 4 further including four side panels.

6. A roof unit as defined in claim 5 wherein each of said side door panels includes a seal adjacent the periphery thereof.

7. A roof unit as defined in claim 6 wherein each of said door panels includes a plurality of horizontal louvers.

8. A roof unit as defined in claim 7 wherein a horizontal flange connects the lower edge of each of said louvers to the upper edge of the louver immediately below said louver.

* * * * *